Feb. 20, 1940.     H. W. ZIMMERMAN     2,190,967
TORQUE MEASURING WRENCH
Filed March 6, 1937
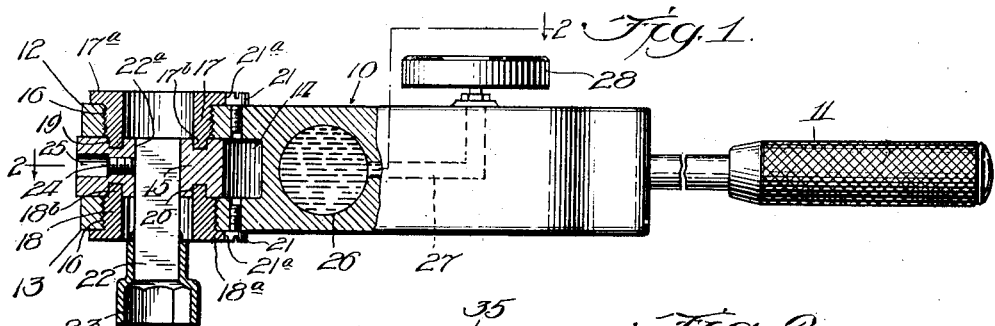
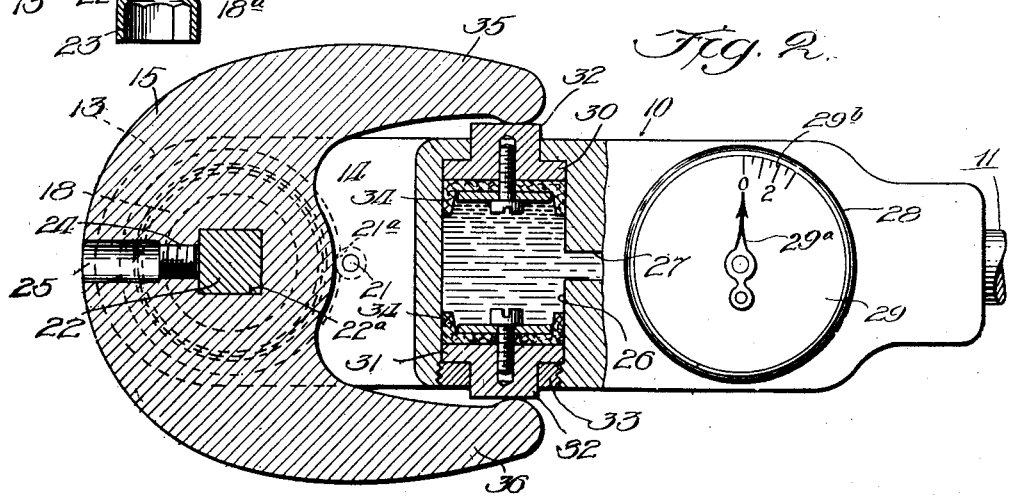
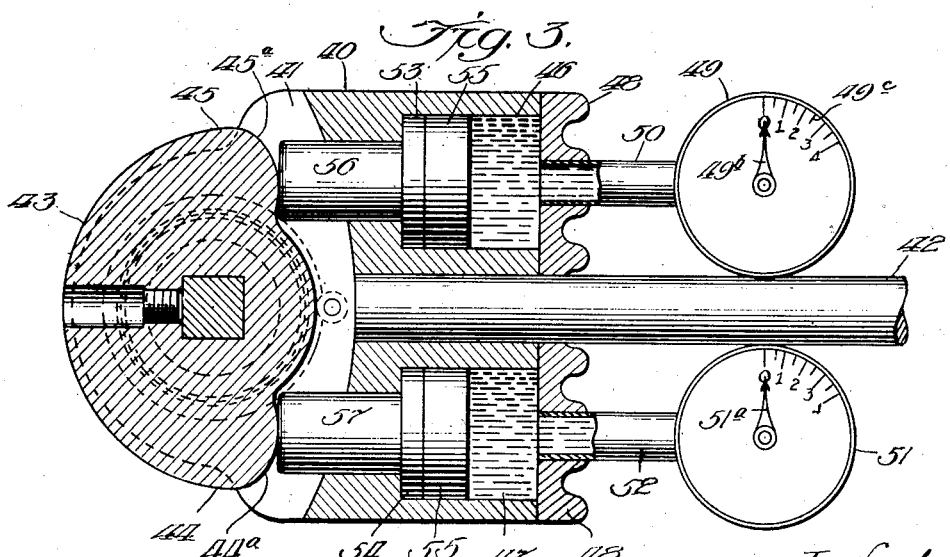
Inventor:
Herman W. Zimmerman
by Davis, Lindsey, Smith & Shonts
Attys.

Patented Feb. 20, 1940

2,190,967

UNITED STATES PATENT OFFICE 2,190,967

TORQUE MEASURING WRENCH

Herman W. Zimmerman, Highland Park, Ill., assignor, by mesne assignments, to Automotive Maintenance Machinery Co., North Chicago, Ill., a corporation of Illinois Application March 6, 1937, Serial No. 129,359

8 Claims. (Cl. 265—1)

My invention relates to wrenches, and it has to do particularly with a wrench adapted for measuring the force or torque applied therethrough in tightening or loosening nuts, bolts, studs, and the like.

One of the objects of my invention is to provide an improved wrench of the foregoing character which is of simple and sturdy construction, is inexpensive to manufacture, and is adapted to perform its torque-measuring function in a highly efficient manner at all times.

Another object is to provide a torque measuring wrench embodying hydraulic means through which the torque measuring function is performed, the arrangement being such that the device may be used to measure the force or torque required to tighten or loosen the work (nut, bolt, stud, or the like) by merely moving the work-engaged device in the proper direction.

Other objects and advantages will become apparent as this description progresses, and by reference to the drawing, wherein:

Figure 1 is a side elevational view, partially in vertical section, of one form of wrench structure embodying my invention;

Fig. 2 is an enlarged top plan view of the structure of Fig. 1, the forward end of the structure being shown in horizontal section taken substantially along the line 2—2 of Fig. 1; and Fig. 3 is a view similar to Fig. 2 showing another form of wrench embodying my invention.

The wrench structure shown in Figs. 1 and 2 includes an elongated head 10, to the rear end of which a handle 11 is secured in any desired manner. The forward end of the body 10 is provided with a pair of vertically spaced, plate-like extensions 12, 13, providing a comparatively deep space 14 which opens outwardly at the end and sides thereof.

A rock member 15 adapted to be operatively engaged with the work (nut, bolt, stud, or the like) is mounted within the space 14, as will now be described. The upper and lower plate-like portions 12, 13 are provided with aligned threaded openings 16 adapted to receive similar threaded bushings 17, 18 having head portions 17ª and 18ª adapted to seat upon the respective outer surfaces of the extensions 12 and 13. The inner ends of the bushings 17, 18 are provided with slightly reduced, annular projections 17ᵇ and 18ᵇ which extend into suitably provided annular, aligned grooves 19 and 20 in the opposite faces of the rock member 15. The relationship of the parts just described is such that when the bushings 17 and 18 are assembled in the manner shown in Fig. 1, the rock member 15 is rockably supported in position between the extensions 12 and 13, and it is adapted to rock without any substantial cramping or cocking action. The bushings 17 and 18 are each locked in their fully assembled positions by lock screws 21 adapted to engage suitably threaded openings in the body 10 and so located that their heads are engaged in suitable notches 21ª formed in the peripheries of the bushing heads 17ª and 18ª.

The rock member 15 is provided with a central, rectangular, or other irregularly shaped, opening 22ª, axially aligned with the openings through the bushings 17, 18, and it is adapted to receive a similarly shaped adapter device 22 which is of sufficient length to project downwardly through the lower bushing 18 and therebeyond to receive a suitable work-engaging socket 23 or any other suitable and well-known work-engaging adapter device. The adapter device 22 is fixedly secured to the member 15 by a set screw 24 engaged with the inner threaded portion of an opening 25 formed in the member 15.

When the rock member 15 is operatively engaged with the work and the wrench handle 11 is actuated (in a clockwise direction as viewed in Fig. 2) to tighten the work, the rock member 15 and body 10 tend to rock relatively. In carrying out my invention, I oppose this rock movement by hydraulic means, the extent of pressure application to which is measured, preferably in inch-pounds, to determine the amount of force or torque applied through the wrench in tightening the work. Specifically, the head 10 is provided with a laterally-extending chamber 26 which is adapted to be filled with oil or other fluid suitable for hydraulic operation. The chamber 26 is connected with a hydraulic pressure gage 28 by a passage 27. The pressure gage 28 may take any suitable and well-known form, including a dial 29 and a gage hand 29ª actuated rotatably with respect to a scale 29ᵇ by any mechanism (not shown) of known form which is controlled by the displacement of fluid such as the fluid in the chamber 26 and passage 27. The scale 29ᵇ is so calibrated that each calibration thereof indicates a predetermined fluid displacement through the application of a predetermined inch-pounds pressure to the fluid in chamber 26.

Pressure is applied to the fluid in chamber 26 through a pair of piston devices 30, 31, one in each end of the chamber 26 (Fig. 2) and each having a plunger stem-like portion 32 slidably and snugly received in and projecting through openings suitably provided in the adjacent side wall of the head 10. For convenience in assembly, one end of the chamber 26 is provided with a threaded opening adapted to be closed by a threaded plug 33 which has an opening therein through which the plunger stem-portion 32 of the piston device 31 projects. The piston devices 30, 31 are each provided with suitable seal gaskets 34, the purpose of which will be well understood. With the chamber 26 and passage 27 properly filled with fluid, inward movement of either piston device 30, 31 results in the application of pressure to the fluid in the chamber 26, thereby effecting a displacement of such fluid and actuating the pressure gage hand 29a to indicate the amount of inch-pounds pressure employed.

Movement of the piston 30, 31 is accomplished by means of arms 35 and 36 projecting rearwardly from the opposite sides of the rock member 15 through the opposite sides of the rock space 14. The arms 35, 36 are of such length that their free ends extend back along the sides of the head 10 and they are disposed in alignment with the outer ends of the piston plunger stems 32. The relationship of these parts is such that in the normal, at-rest condition of the wrench, the arms 35 and 36 merely engage the outer ends of the piston plunger stems 32 without exerting any pressure thereon so that the pressure gage hand 29a remains at zero (0) position with respect to the scale 29b of the pressure gage.

In the use of the foregoing structure, when the member 15 is operatively engaged with the work through the adapter device 22 and the wrench handle 11 is moved in a clockwise direction (as viewed in Fig. 2) to tighten the work, the force applied is transmitted to the work through the head 10, the hydraulic means and the member 15. The gage device 28 is preferably set so that a predetermined initial pressure is required before the fluid in the chamber 26 and passage 27 will be displaced to effect movement of the gage hand 29a away from the zero mark of the scale 29b. When the resistance offered by the work requires the application of sufficient force or torque or pressure to effect a displacement of the liquid in chamber 26 and passage 27, such displacement will, in a manner well understood, cause movement of the gage hand 29a in clockwise direction to an extent determined by the amount of pressure applied through the hydraulic means and the extent of displacement of the fluid in the chamber 26 and passage 27. The operator, therefore, in using this wrench, may accurately determine the amount of force or torque applied to the work by observing the gage hand 29a with respect to the scale 29b which, as above stated, is calibrated to indicate inch-pounds pressure. The operator may thereby avoid applying such pressure as may cause breakage or distortion of the work on account of using force in excess of the tensile strength thereof. Or, through this same medium, the operator, by observing the pressure required to set up any particular piece of work, such, for example, as the cylinder head studs of an automotive engine, may set up each piece of work or stud to the same extent.

The foregoing applies equally well to loosening the work. For example, if it is desired to determine the amount of force or torque required to loosen any particular piece of work, under conditions of test or otherwise, the wrench may be applied to the work and the handle moved in the proper direction (counterclockwise as viewed in Fig. 2) and the pressure gage 28 observed to indicate the pressure applied. Or, if in tightening the work it is tightened to an excessive extent, the wrench, without removing it from the work, may be actuated in a work-loosening direction and the gage observed so that the wrench will be actuated only to an extent wherein it is necessary to apply the particular desired pressure to further loosen the same.

The structure above described, while being of a double-acting type, embodies but a single hydraulic chamber and gage structure. In some instances, it may be desirable to employ separate hydraulic cylinders for tightening and loosening the work, and I have shown such an arrangement in Fig. 3. Specifically, this structure includes a body 40 having a rock space 41 at its forward end similar to the rock space 14 of Fig. 2. It is also provided with a rearwardly extending handle 42. A part-circular rock member 43 is mounted in the rock space 41, and it is so constructed that arm-like portions 44, 45 are formed at the opposite sides thereof. The body 40 is provided at its opposite sides with longitudinally extending chambers 46, 47 adapted to receive oil or other suitable liquid for hydraulic operation. The rear ends of the chambers 46, 47 are closed by end members 48 secured in place in seal-tight fashion in any suitable manner. The rear end of the chamber 46 is connected to a hydraulic pressure gage 49, similar to the pressure gage 28 (Figs. 1 and 2) by a suitable conduit 50, and the rear end of the chamber 47 is connected to a similar pressure gage 51 by a conduit 52. The forward ends of the chambers 46 and 47 are provided with pistons 53 and 54, respectively, each having a gasket head 55. The pistons 53 and 54 are provided with forwardly-extending stems 56 and 57 which slidably project through suitable openings formed in the tool head 40 and leading from chambers 46 and 47 to the rock space 41. The piston plunger stems 56 and 57 are of sufficient length to project into the rock space 41 to engage the curved faces 44a and 45a of the arm-like elements 44 and 45 on the rock member 43, the arrangement being such that when the wrench is in normal, at-rest position, the plungers 56 and 57 merely engage the arm-like elements 44 and 45 without exerting any pressure thereon so as to hold the rock member 43 in a neutral position.

In the use of this device, when it is desired to tighten the work, the handle is moved in proper direction (clockwise as viewed in Fig. 3) and, when the work offers sufficient resistance to movement of the handle 42, the force or torque or pressure applied to effect further tightening movement of the work causes a displacement of the fluid in chamber 47. The gage 51, like the gage 28, registers, through movement of its hand 51a, the amount of displacement of the fluid in chamber 47 and conduit 52 and consequently the force or torque applied through the wrench to the work. When it is desired to loosen the work, the member 43 is applied to the work and the handle 42 is moved in a counterclockwise direction, as viewed in Fig. 3. In this operation, the force or torque is applied to the work through the piston 53 which causes a displacement of the fluid in chamber 46 and conduit 50. This displacement results in movement of the gage hand 49b relative to its scale 49c which is calibrated to indicate inch-pounds pressure. By observing the gage devices, the operator may readily determine the pressure applied to the work and avoid breakage, distortion, etc., as mentioned in connection with the form of Figs. 1 and 2.

It is believed that the operation and advantages of my invention will be well understood from the foregoing. It is also to be understood that while I have shown only two forms of structure embodying my invention, other changes in details and arrangements of parts may be resorted to without departing from the spirit and scope of my invention as defined by the claims that follow.

I claim:

1. A torque measuring wrench comprising a head having a fluid chamber formed therein, a handle thereon, a rockable member carried by said head and having arm elements on the opposite sides of the center of rock movement thereof, said rockable member having provision for engagement with the work, opposed piston members in said chamber, each having a stem portion projecting externally of said head, said arm elements being constructed and arranged to engage said stem portions, respectively, hydraulic-pressure-gage means carried by said head, and fluid means in said chamber and between said piston members and said gage means.

2. A torque measuring wrench comprising a head having a chamber formed therein and extending laterally thereof, a rock member rockably supported at one end of said head and having arms on the opposite sides of its rock center, said arms being elongated to project lengthwise of said head past the ends of said chamber, means by which said rock member is connected with the work, opposed pistons mounted in the opposite ends of said chamber and each having a stem portion projecting outwardly through and beyond said body into engagement with the adjacent one of said arms, a hydraulic pressure gage carried by said body, and means forming a passage leading from said chamber to said gage, said chamber and passage being filled with a fluid whereby displacement of said fluid through movement of either of said pistons by its respective arm actuates said gage to indicate pressure applied through the wrench to the work.

3. A torque measuring wrench comprising a head having an open-sided space at its forward end, a member mounted in said space for rock movement and having arms on the opposite sides of its center of rock movement projecting through the open sides of said space rearwardly along the sides of said head, means by which said rockable member is connected with the work, means forming a lateral chamber in said head, the ends of which are aligned with said arms, mechanism for registering displacement of fluid, said mechanism being arranged to indicate said displacement in units of pressure, said head having a passageway connecting said chamber with said mechanism, said passageway and chamber being filled with a hydraulic-acting fluid, opposed pistons in the opposite ends of said chamber, each piston having a stem portion projecting through said head into engagement with the adjacent of said arms, the arrangement being such that the pressure exerted through said head and arms to the work causes relative displacement of said fluid through said pistons, which pressure is indicated by said displacement registering means.

4. A torque measuring wrench comprising a head having a pair of chambers formed therein, a handle on said head, a member rockably carried by said head and having a pair of arm elements thereon on opposite sides of the rock center thereof, means detachably carried by said rock member coaxial with the rock center thereof for connecting the same with the work, a piston in each of said chambers, each having a stem portion projecting through said head into engagement with one of said arm elements, a mechanism connected to each of said chambers for registering fluid displacement in relation to the pressure required for such displacement, and passageway means leading from each of said chambers to each of said mechanisms, said chambers and passageway means being filled with a fluid.

5. A torque measuring wrench comprising a head having a pair of chambers formed therein, a handle on said head, a member rockably carried by said head and having a pair of arm elements thereon on opposite sides of the rock center thereof, means carried by said rock member coaxial with the rock center thereof for connecting it with the work, a piston in each of said chambers, each having a stem portion projecting through said head into engagement with one of said arm elements, a separate mechanism connected to each of said chambers for measuring fluid displacement in terms of pressure, means providing a passageway leading from each of said chambers to its respective mechanism, both said chambers and their said passageways being filled with a fluid, the arrangement being such that displacement of the fluid in either of said chambers by movement of its respective piston and arm element actuates the respective measuring mechanism independently of the other mechanism to indicate the pressure required to effect such displacement and, in turn, the pressure applied to the work.

6. In a torque measuring wrench, a head, a handle thereon, a member rockably carried by said head and having a pair of laterally extending arm elements on the opposite sides of the rock center thereof, means secured to said rock member coaxial with the rock center thereof by which it may be connected with the work, said head having a pair of spaced, longitudinally extending chambers therein aligned with said arm elements, a piston in each of said chambers and having a stem portion projecting into engagement with the adjacent of said arm elements, a mechanism for each said chamber adapted for measuring fluid displacement in terms of pressure required for such displacement, each said chamber being filled with a fluid adapted to be displaced by movement of said pistons and arm elements when the wrench is actuated by said handle with said rockable member applied to the work.

7. In a torque measuring wrench, a head, a handle thereon, a member rockably carried by said head and having a pair of laterally extending arm elements on the opposite sides of the rock center thereof, and a single hydraulic pressure registering means including a single cylinder and opposed pistons in substantially axial alignment in said cylinder associated simultaneously with both said arm elements opposing rock movement of said arm elements and rockable member in both directions when said rockable member is connected to the work and said handle is actuated rotatably in either direction.

8. A torque measuring wrench comprising a body having a transverse recess in one end thereof, a handle projecting from the other end of said body, a member mounted within said recess, said member having arms projecting from opposite sides thereof, means pivotally supporting said member in said recess, means carried by said rock member coaxial with the rock axis thereof for detachably connecting said member with the work, piston members, one for each of said arms, reciprocably carried by said body, each said piston member having a stem portion engaged by its respective arm, hydraulic pressure-gage means carried by said body, and fluid means carried by said body between and operably associated with said piston members and gage means, whereby said fluid means is displaced by relative rock movement of said rock member to actuate said gage means and indicate pressure applied through the wrench to the work.

HERMAN W. ZIMMERMAN.